(12) United States Patent
Stein et al.

(10) Patent No.: US 7,907,620 B2
(45) Date of Patent: Mar. 15, 2011

(54) METHOD OF HANDLING OF ATM CELLS AT THE VP LAYER

(75) Inventors: Shai Stein, Raanana (IL); Moredechay Morgenstern, Petach-Tikva (IL); Aharon Lavon, Lod (IL)

(73) Assignee: ECI Telecom Ltd., Petach Tikva (IL)

( * ) Notice: Subject to any disclaimer, the term of this patent is extended or adjusted under 35 U.S.C. 154(b) by 779 days.

(21) Appl. No.: 10/564,893

(22) PCT Filed: Jul. 1, 2004

(86) PCT No.: PCT/IL2004/000585
§ 371 (c)(1),
(2), (4) Date: Jan. 17, 2006

(87) PCT Pub. No.: WO2005/008976
PCT Pub. Date: Jan. 27, 2005

(65) Prior Publication Data
US 2006/0171400 A1 Aug. 3, 2006

(30) Foreign Application Priority Data
Jul. 15, 2003 (IL) .......................................... 156923

(51) Int. Cl.
*H04L 12/28* (2006.01)
(52) U.S. Cl. ...................................................... 370/397

(58) Field of Classification Search .................. 370/229, 370/230, 231, 232, 234, 235, 397, 395.1
See application file for complete search history.

(56) References Cited

U.S. PATENT DOCUMENTS

| | | | | |
|---|---|---|---|---|
| 5,375,121 A * | 12/1994 | Nishino et al. | ................ | 370/473 |
| 5,530,698 A * | 6/1996 | Kozaki et al. | ................ | 370/355 |
| 5,761,191 A * | 6/1998 | VanDervort et al. | .......... | 370/232 |
| 5,905,715 A | 5/1999 | Azarmi et al. | | |
| 5,946,313 A * | 8/1999 | Allan et al. | .................... | 370/397 |
| 5,999,518 A * | 12/1999 | Nattkemper et al. | .......... | 370/258 |
| 6,044,079 A * | 3/2000 | Calvignac et al. | ....... | 370/395.32 |
| 6,148,001 A * | 11/2000 | Soirinsuo et al. | .......... | 370/395.4 |
| 6,314,103 B1 | 11/2001 | Medhat et al. | | |
| 6,597,689 B1 * | 7/2003 | Chiu et al. | .................... | 370/354 |

* cited by examiner

*Primary Examiner* — Derrick W Ferris
*Assistant Examiner* — Mohammad Anwar
(74) *Attorney, Agent, or Firm* — Browdy and Neimark, PLLC

(57) ABSTRACT

The invention proposes a method for handling ATM traffic comprising packets of AAL5 type composed of ATM cells, at a network node at VP-layer. The method comprises monitoring each of the cells incoming the node to obtain information at least on its VC-layer and VP-layer parameters, processing information on the mentioned parameters and registering the processed information concerning each of the cells in a statistical database to obtain statistical data with respect to at least the VC-layer and VP-layer parameters of the packets handled at the node.

16 Claims, 5 Drawing Sheets

VCC - Virtual Channel Connection
VPC - Virtual Path Connection
VCI - Virtual Channel Index
VPI - Virtual Path Index
 IF - Interface
 PD - Partial Discard
 FD - Full Discard

| VCC ENTRY n=f(VC,V̄P1) | VPI | VCI | OWN CELLS COUNTER | OTHER CELLS COUNTER | STATUS | IF INDEX |
|---|---|---|---|---|---|---|
| 1 | | | | | | |
| 2 | 3 | 15 | 0 | 1+1+1... | BEGIN PACKET | |
| ○ ○ ○ | | | | | | |
| h | 1 | 2 | 1+1+1+1... | 1 | IN PACKET | |
| ○ ○ ○ | | | | | | |
| ○ ○ ○ | | | | | PD | |
| ○ ○ ○ | | | | | | |
| N | | | | | FD | |

FIG.2

PD - Partial Discard
FD - Full Discard

METHOD OF HANDLING OF ATM CELLS AT THE VP LAYER

BACKGROUND OF THE INVENTION

The present invention relates to a method of handling and discarding ATM packets, more particularly AAL5 packets, in cases of traffic congestion in telecommunication networks.

BACKGROUND OF THE INVENTION

The growing problems of traffic jams in modern telecommunication networks make unavoidable some data loss/data discard in cases of congestion, especially at network elements which aggregate a great number of data flows. For example, access networks nodes are responsible for transmitting traffic streams from numerous subscribers to a transport network, such as ATM, and vice versa.

Typically, the access node constitutes a Digital Signal Line Access Multiplexer—DSLAM), being capable of receiving a digital format traffic flow in an upstream direction, from the corresponding subscribers (e.g., over one or more xDSL lines) and transmitting them towards the ATM network. The DSLAM is also capable of receiving a digital format traffic flow in the downstream direction, from the ATM network and distributing it among its corresponding subscribers. The ATM connections may carry several types of traffic, sometimes categorized according to the ATM Adaptation Layer (AAL) type. One of the most widespread AAL types is AAL5, according to ITU-T I.363.5 standard.

A conventional DSLAM handling AAL5 packets of ATM may operate either at VP layer, or at VC layer. The AAL5 packet contains an integral data unit, which is segmented into ATM cells. The last cell that carries data from the AAL5 packet is identified by a special mark (occupying a bit in the PTI—Payload Type Identifier field of the cell header).

DSLAM handles a huge plurality of virtual channels VCs and may handle many Virtual Paths VPs. Any virtual channel comprises VC-services, for example voice, data, IP services, which can be carried over ATM. When handling AAL5 packets at the VC-layer, DSLAM recognizes when any AAL5 packet terminates. In case of traffic congestion, the DSLAM therefore is able to execute any known packet discard policy so as to avoid forwarding useless cells belonging to a packet affected by such discard operations. At the VC-layer, the discard decisions are usually provided according to:
  A Partial Discard (PD) policy (After a cell is discarded for a congestion reason, all following cells of that packet will be discarded too, except for the last cell carrying the PTI field special mark), or
  A Full Discard (FD) policy (Before forwarding the first cell in a packet, DSLAM verifies that there is enough resources to forward all cells in the packet. In case there is a problem, all cells of the packet will be discarded).

The VP layer (VP-connection) is an aggregation of various services in the form of a mixture of AAL5 packets. The packet streams are multiplexed and enter the DSLAM to be further cross-connected. At VP-layer, the DSLAM is "unaware" both about the type of VC-services inside the VP-connection, and about the status of packets (i.e. whether there are packets which are in the middle of transmission, or are there packets which just terminated/started)

In cases of traffic congestion, while handling the AAL5 on VP-layer, cells are usually thrown away in a cell-based manner, regardless the AAL5 packet boundaries. This cell-based manner of discarding ATM cells has a reduced efficiency as the destination ATM network receives damaged and useless packets.

US published patent application 2002/0018474 A1 describes a method and apparatus, that enables high throughput of complete packets, transmitted under a packet switching protocol, such as the Internet Protocol (IP), over an ATM node. It is based on buffer threshold management, rather than on tracking individual Virtual Channels (VC). The method is suitable for cases in which data cells are routed according to their virtual path (VP). The basic principle of the method is to ensure that while accepting input data, the buffer has enough available capacity to store complete frames of as many VCs as possible and that, conversely, as long as the buffer's available capacity falls short of such a condition, all incoming data are discarded.

Though the above publication proposes a sort of solution for discarding packets at the VP-layer, it is based exclusively on providing available buffer capacity and, actually, gives a binary answer whether to start discarding cells or not. When the proposed algorithm decides to "block" a buffer, it is performed with respect to all the involved streams at once, practically breaking all currently passing AAL5 packets in the middle. More than that, when the algorithm decides to resume traffic into a buffer it is also performed to all the involved traffic. As a result, there are potentially many AAL5 packets without their respective prefix (i.e., useless cells are forwarded).

SUMMARY OF THE INVENTION

The object of the present invention is to provide a method of handling ATM packets (preferably of the type AAL5) at a network node, which would ensure awareness of the node handling the traffic at the VP-layer about particulars of packets characteristic for the VC-layer. In other words, the method should make the node aware about such particulars as the practical nature and behavior of various AAL5 streams inside a particular VP connection.

It is another purpose of the present invention to provide an enhanced discarding method at the VP layer based on the above-mentioned awareness, to effectively utilize the available bandwidth.

The first object can be achieved by providing a method of handling ATM traffic comprising packets of AAL5 type composed of cells, at a network node at VP-layer, the method comprising:
  monitoring each of said cells incoming the node to obtain information on its VC-layer and VP-layer parameters,
  processing information on said parameters,
  registering the processed information concerning each of said cells in a statistical database to obtain statistical data with respect to at least VC-layer and VP-layer parameters of the packets being handled at the node.

The ATM packets, as has been emphasized, are preferably AAL5 packets, since presently only AAL5 packets allow both monitoring VC-layer and VP-layer parameters such as VC-Index (VCI) and VP-Index (VPI), and carry indications of end of the packet (at the VC-layer). Would any other type of ATM packets (presently or in the future) satisfy these conditions, the invention should be considered to relate to such packets as to the ATM AAL5 packets.

The network node may preferably constitute a DSLAM.

In a more specified manner, there is proposed a conceptual method of handling ATM AAL5 packets traffic at a network node at a VP layer, wherein each of said packets belongs to a particular VCC (Virtual Channel Connection) and a particular VPC (Virtual Path Connection), and wherein each said packet comprises a plurality of ATM cells, all cells of the same packet carrying the same value of VC-index (VCI) and the same value of VP-index (VPI), the method comprises:

providing a statistical database, monitoring the VPI and VCI values of each incoming ATM cell, processing the obtained VCI and VPI values of each of the monitored cells, and registering a result of the processing per each of the monitored cells in the statistical database, thereby enabling awareness of the network node about VCCs at the VP layer and frequency of their appearance in the ATM traffic being handled.

The VC connection (VCC) is related to a stream of cells of a specific VC-service. The VC-Index (VCI) indicates a particular VC connection VCC.

The VP connection (VPC) is related to a stream of cells of a specific Virtual Path. The VP-Index (VPI) indicates a particular VP connection VPC.

The network node may have one or more ATM interfaces. The ATM Interface is related to a stream of cells of a plurality of Virtual Paths.

The method may comprise providing a separate database for each particular ATM Interface of the node. The method, as defined above, can directly be applicable to that case i.e., when one or more ATM Interfaces of the node are served by separate respective databases.

Alternatively, all (or a number) of the multiple ATM Interfaces of the node can be served by a common database. In this case, the method will comprise an additional step of indicating a particular ATM Interface, for each ATM cell received there-through, by an additional parameter being a unique ATM Interface index (IfIndex), and will therefore comprise monitoring each of the incoming cells from the point of that additional parameter, processing the additional parameter together with the other mentioned parameters and registering the processing result in the common statistical database, to form said statistical data for the packets being received through said particular ATM Interface and handled at the node.

In the preferred, more advanced version of the method, it further comprises monitoring each of the incoming ATM cells from the point of "end of packet" indication; in the AAL5 packets, said indication is performed in the PTI field of the cell header.

Based on the presence or absence of said indication, the method comprises complementing the statistical database with a status of cells stream (VCC) to which the cell being registered belongs, thereby enabling awareness of the network node, at the VP-layer, about status of the presently monitored VCC and status of the AAL5 packet to which said cell belongs.

Specific exemplary sub-steps for registering the cells in the statistical database are described below. The succession of steps is suitable for a single ATM Interface, as well as for a case in which several ATM Interfaces are involved.

The statistical database can be built as a status table of VCCs (Virtual Channel Connections) handled by the network node (e.g., DSLAM). The table can be arranged for N entries or records (say, assigned to lines of the table) intended for N different VCCs. Each entry can be divided into a number of fields (say, assigned to columns of the table). For example, the columns can respectively be assigned to: an IfIndex value, a VPI value, a VCI value, a counter of "own cells", a counter of "other cells", and AAL5 packet status. In a particular entry, all the fields are related to the particular VCC to which said entry is assigned. In case the database serves for a single ATM interface, it is possible to omit the IfIndex column/field from the table.

The step of processing the parameters: IfIndex, VCI and VPI values can preferably be performed by applying an arbitrary function f(IfIndex, VPI, VCI)=n (n=1 ... N) to values of IfIndex, VPI and VCI of each of the incoming ATM cells. However, in cases where the node has a single ATM Interface, or each of the multiple ATM Interfaces is served by a separate database, the arbitrary function related to a particular ATM Interface may read as f(VPI, VCI)=n (n=1 ... N), i.e. the value of parameter IfIndex can be omitted. The value n is a natural number between 1 and N, and represents the entry/line number in the statistical database to which the incoming ATM cell is mapped, wherein the value N represents the total number of entries in the said statistical database.

Since the number N of entries in the table is usually smaller than a number of possible combinations of the parameters values (IfIndex, VPI, VCI), the function "f" can be selected in such a manner that some different combinations of IfIndex, VPI and VCI values are assumed to give the same result "n", and thus multiple (IfIndex, VPI, VCI) combinations will be mapped to the same entry in the database.

The analogous consideration applies to the mentioned cases where there are only two parameters (VPI, VCI) to be processed.

EXAMPLE 1

Let N=10, and a database with N=10 entries serves one ATM Interface. The function f(VPI, VCI) may be selected as follows:

$$n=[(VPI+VCI)/N]+1;$$

The entry number n=3 can be obtained if the ATM cell under monitoring has VPI=0 and VCI=3, but also if the values are (respectively) 9 and 4, or 15 and 18, etc.

For registration of the monitored cell in the table, and in order to distinguish between different VCCs, the columns "own cells" and "other cells" can be used as follows. A first VCC occupying the entry "n" will first set the values of VCI and VPI columns/fields to be its own values, and then turn both the counter of "own cells" and the counter of "other cells" to zero. If the next cell mapped to that entry belongs to the same VCC (i.e., the cell has the same VCI and VPI values as those found in the VPI and VCI columns of the entry), the counter of "own cells" will be incremented by one. If the next cell mapped to this entry belongs to another VCC (i.e., the function f(VPI, VCI) maps the new arrived ATM cell to the same database entry number "n" but the VCI and/or VPI values of the new arrived ATM cell are different than those found in the VPI and VCI columns/fields of the entry "n"), the counter of "other cells" will be incremented by one.

In case there is a separate statistical database assigned per each ATM interface, the arbitrary function "f" may be different for different ATM interfaces.

EXAMPLE 2

N=10, and the database with 10 entries serves a number of ATM interfaces. The function f(IfIndex, VPI, VCI) may be selected as follows:

$$n=[(IfIndex+VPI+VCI)/N]+1;$$

The entry number n=3 can be obtained if the ATM cell under monitoring came on ATM interface marked with IfIndex=4190, and has VPI=0 and VCI=3, but also if the IfIndex, VPI and VCI values are (respectively) 4190, 9 and 4, or 5234, 10 and 19, etc.

A first VCC occupying the entry "n" will first set the values of IfIndex, VCI and VPI columns/fields to be its own values, and then turn both the counter of "own cells" and the counter of "other cells" to zero. If the next cell mapped to that entry belongs to the same VCC (i.e., the cell came on the same ATM interface IfIndex and has the same VCI and VPI values as those found in the IfIndex, VPI and VCI columns of the entry), the counter of "own cells" will be incremented by one. If the next cell mapped to this entry belongs to another VCC (i.e., the function f(IfIndex, VPI, VCI) maps the new arrived ATM cell to the same database entry number "n" but any of the IfIndex, VCI and VPI values of the new arrived ATM cell are different than those found in the respective columns of the entry, the "other cells" counter will be incremented by one. The database therefore allows obtaining statistics concerning the most frequent data streams entered to the node by the ATM interfaces, which are served by that database.

It should be noted that yet another configuration is possible i.e., when some of the plurality of ATM interfaces of the node are served by separate databases, while some of them are served by one or more common databases; therefore, the method may comprise various combinations of the above-described steps.

The providing of the database also supposes updating thereof. The entry number "n" is assigned to a specific VCC (that is mapped to the entry by the function "f" if the entry is "free" or "replaceable". A free entry is one that never before served a VCC.

A replaceable entry is an entry which is already assigned to a VCC for which the "own cells" value is very much less (say, by a predetermined ratio) than the "other cells" value. Such a "replaceable" entry of the database is updated upon the arrival of any ATM cell from a VCC other than the one to which the entry is already assigned, provided that the new VCC is mapped to that same entry.

The described specific steps assure that, for each natural value n in the range 1 to N, the most frequent VCCs will have a higher probability to be registered in the entries of the database. In other words, ATM cells belonging to a VCC "keeping" an entry in the table appear more frequently than cells of all other VCCs having the same computed entry value n=f(VPI, VCI) or n=f(IfIndex, VPI, VCI), whatever applies.

In an advanced version of the method, upon determining status of the VCC which is being monitored, it comprises indicating the status in the suitable column/field of the statistical database as follows:
  a. In Packet—The monitored VCC is in the middle of the AAL5 packet transmission;
  b. Begin Of Packet—The monitored VCC starts transferring a new packet (i.e., the previous ATM cell belonging to the VCC under monitoring carried an "End Of Packet" indication);

The method, in a further advanced version, upon determining the status of the VCC that is being monitored, comprises indicating additional status options, for example information that the current VCC is already under a packet discard process. The following additional status options can be indicated in the same column/field of the statistical database, if such take place:
  c. Partial Discard—The monitored VCC is in the middle of AAL5 packet transmission and all the ATM cells of that packet, excluding the last cell of the AAL5 packet, are being discarded.
  d. Full Discard—The monitored VCC is in the middle of AAL5 packet transmission and all the ATM cells of that packet are being discarded.

The information that is collected in the table might be useful for various purposes. For example, it can be very useful for applying any AAL5 packet discard policy (which is normally applied at the VC layer), to the VP layer, since the proposed database provides the network node, that operates at the VP layer, awareness to the situation at the VC layer.

Thus, according to another aspect of the invention, there is also provided a mechanism of AAL5 packets discard at a VP-layer, with respect to said packets handled at a network node according to the above-described method, the packet discard mechanism comprises:
  detecting a new congestion event in the network, usually for a particular ATM Interface, while monitoring a cell belonging to a particular VCC,
  analyzing information in the statistic database, based on the analysis deciding whether said particular VCC is suitable for discarding according to this method,
  if yes, discarding cells of the VCC according to a selected discard policy,
  if not, performing the mechanism with respect to a new incoming cell provided that the congestion state persists.

A new congestion event may, for example, be caused by exhausting memory resources, such as a critical FIFO condition for a particular ATM Interface.

The step of analyzing information in the statistic database generally comprises checking, whether the particular VCC is registered as one of "N" entries of the table.

If yes, it should be one of the "good candidates" for the discard since, being a recorded VCC with a high frequency of AAL5 packets stream, it can be expected to quickly resolve the congestion problem, especially if discarded rationally.

If the VCC is not registered in the database, the fact probably indicates that the ATM cells of this VCC are not so often. Hence, there is a small effect in discarding the ATM cells of that VCC according to this method. However, we may assume that the cell can be discarded by any conventional cells-based VP layer algorithm, if applied at the node.

Further, the analyzing step comprises checking status of the packet.

Depending on the status "in packet" or "begin of packet", the following discard decisions can be made:
  when the status is "begin of packet", a Full Discard policy is applied;
  when the status is "in packet", a Partial Discard policy is applied.

Optionally, if the statistic database allows, the analysis step may include a check whether cells of the particular VCC are already under discard. If yes, there will be a need to repeat the method with respect to the VCC of the next incoming cell if the congestion state persists.

Further optionally, the method may comprise forecasting an expected congestion event (for example, based on the actual capacity of buffers with respect to an expected length of an incoming packet). If such an expected event is forecast, a discard decision can be made for the incoming VCC which is considered and performed on the basis of status "begin of packet" and by applying a Full Discard policy.

According to yet another aspect of the invention, there is provided a software product comprising software implementable instructions and/or data for carrying out at least one of the methods described above.

Also, there is a carrier medium comprising the above software product, which should be protected by the patent that is applied for.

Finally, there is provided a network node, such as DSLAM, adapted to and capable of performing at least one of the described methods, for example by accommodating said carrier medium and further implementing the mentioned software product.

Further details of the invention will become apparent as the description proceeds.

BRIEF DESCRIPTION OF THE DRAWINGS

The invention will further be described and illustrated with the aid of the following non-limiting drawings, in which.

DETAILED DESCRIPTION OF THE PREFERRED EMBODIMENTS

Figure 1:
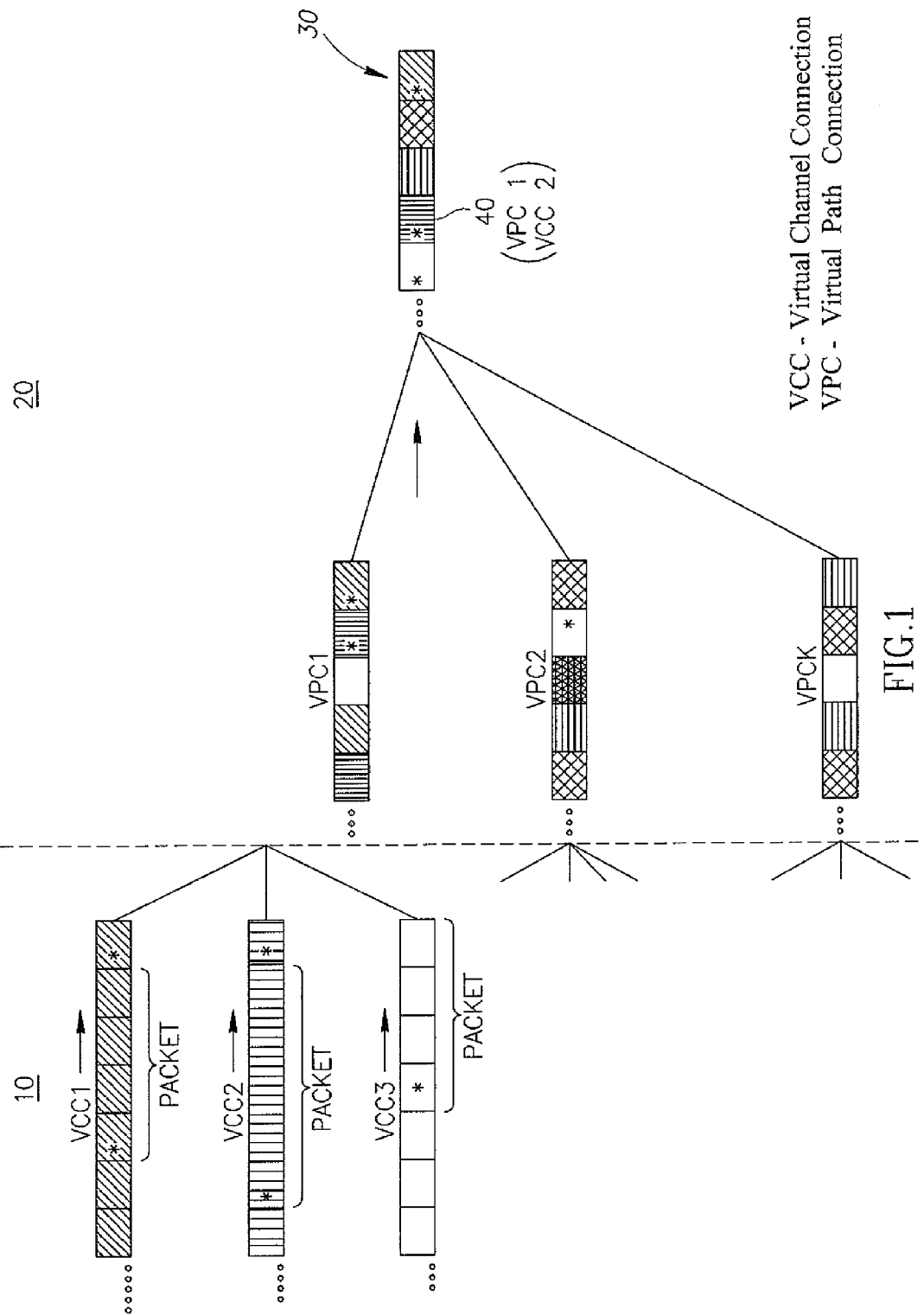
FIG. 1 schematically illustrates the principle of multiplexing VC-channels into VP-streams in DSLAM FIG. 2 schematically illustrates a statistical table according to the invention FIG. 3 schematically illustrates one possible algorithm of handling and registration of ATM packets according to the invention FIG. 4a schematically illustrates one algorithmic version of a packet discard mechanism according to the invention, in case of detecting a real congestion problem.

FIG. 1 schematically shows a chart of multiplexing divided into a VC-layer 10 in the left portion of the drawing and a VP-layer 20 in the right portion of the drawing. The multiplexing is performed, for example, by a DSLAM (Digital Subscriber Line Access Multiplexer). At the VC-layer, three virtual VC connections VCC1, VCC2, VCC3 are shown; in this example, each of the VC connections is a succession of ATM cells forming AAL5 packets of various lengths.

Differently shaded cells schematically show different AAL5 packets transmitted via the VC connections VCC1, VCC2, and VCC3. The last cell in each packet is always marked; in the drawing, last cells in the VC connections are indicated with asterisks.

In certain scenarios, such as upon multiplexing a number of VC-connections (VCCs) with the same service or when plurality of VCCs travel to/from the same ATM entity, the DSLAM may be configured to bundle a plurality of VCCs in a form of a Virtual Path Connection (VPC) to uniformly handle all ATM cells in the VPC. The DSLAM further may handle a plurality of Virtual Path connections (VPC1, VPC2 and VPCk are shown), and this layer is called the VP-layer. Each VPC comprises interleaved cells of the VC-connections, so that VPCs transmit ATM packets in the form of ordered ATM cells, while ATM packets are intermixed. At the physical level of the ATM interface, the Virtual Path connections (VPC1, VPC . . . . VPCk) are further multiplexed, and DSLAM actually handles the resulting stream 30 of incoming/outgoing cells through one ATM Interface, where cells from different Virtual Channels and Virtual Paths are totally mixed, while the order of cells in each individual VPC and VCC is preserved. Though, each of the ATM cells carries indications of their VC and VP indexes (VCI and VPI). E.g., there is a plurality of cells in the resulting stream, one cell of which is marked as 40 (belongs to VPC1, VCC2). The last cells of packets still carry indications of the end (asterisks).

The present figure shows streams formed at one ATM interface, but other ATM interfaces may exist at the node.

The present invention is based on continuous monitoring the incoming cells entering a network node via one or more ATM interfaces, and on determining their belonging to a particular VCC (Virtual Channel Connection) and VPC (Virtual Path Connection), which is defined by a combination of the VCI, VPI and IfIndex characterizing each incoming cell. Also, status of the cells in the packet is to be monitored.

FIG. 2 illustrates an exemplary structure of the statistic database 50 according to the invention, for a specific ATM Interface. Note that in this example all considered ATM cells relate to the same ATM Interface, have the same IfIndex value, and thus the IfIndex value is not recorded in the database. The database constitutes a table that comprises N lines (52) each assigned to a particular VCC entry, and a number of columns (54) each assigned to a specific parameter of the VCC. Any incoming ATM cell, if it is of the AAL5 type or the like, is characterized by specific VCC and VPC to which it belongs and carries VC-index VCI and VP-index VPI. Any incoming ATM cell is mapped to a particular VCC entry n (where n is a natural number $1 \leq n \leq N$) according to a preselected function f(VCI, VPI). The table is built so that the number of entries is less than the number of possible combinations between the VCI and VPI values, so cells of more than one VCC may be mapped to one and the same entry. This is reached by selecting the function f so that it produces the same number "n" for different combinations of VCI, VPI. At the beginning of building the database, entries are randomly registered to VCCs first occurring in the incoming cells stream, and boxes of VPI and VCI in the lines are filled with the specific VPI and VCI values of those firstly registered VCCs. To obtain a statistic indication of frequency of different VCCs in the incoming cells stream, columns 56 and 58 are provided for two counters. The "own cells counter" 56 and "other cells counter" 58 are intended for differentiating between different VCCs which are mapped by the function "f" to the same entry "n". The counter 56 is incremented by one if a new cell belongs to the same VCC which "caught" the entry, i.e. its VPI and VCI values are equal to those registered in the table. The counter 58 is incremented by one, if the new cell belongs to another VCC which is just mapped to the same entry by the function f. When, in a particular entry "n" the counter's 58 reading significantly prevails the counter's 56 reading, the entry "n" can be re-assigned to another VCC. Owing to that, the database 50 dynamically updates itself so that, upon some time, most frequent VCCs are registered in all the N entries with quite a high probability. The column 60 is a column of VCC status. The box 60 for a particular entry can be indicated in one of the four ways: two basic statuses "begin packet" when the marked last cell of a packet has just passed, "in packet" in the opposite case, and two optional statuses: "PD" if the partial packet discard is being performed on the VCC assigned to the entry, and "FD" is the full packet discard is being performed to that VCC. The use and updating of the status column 60 will be described with reference to the exemplary flow charts which follow.

It should be noted that, if the database serves a number of ATM interfaces, the table will preferably comprise a column/field for indicating IfIndex value of the VCC data stream registered in a specific entry of the table (the optional column is shown in dotted lines).

Figure 3:
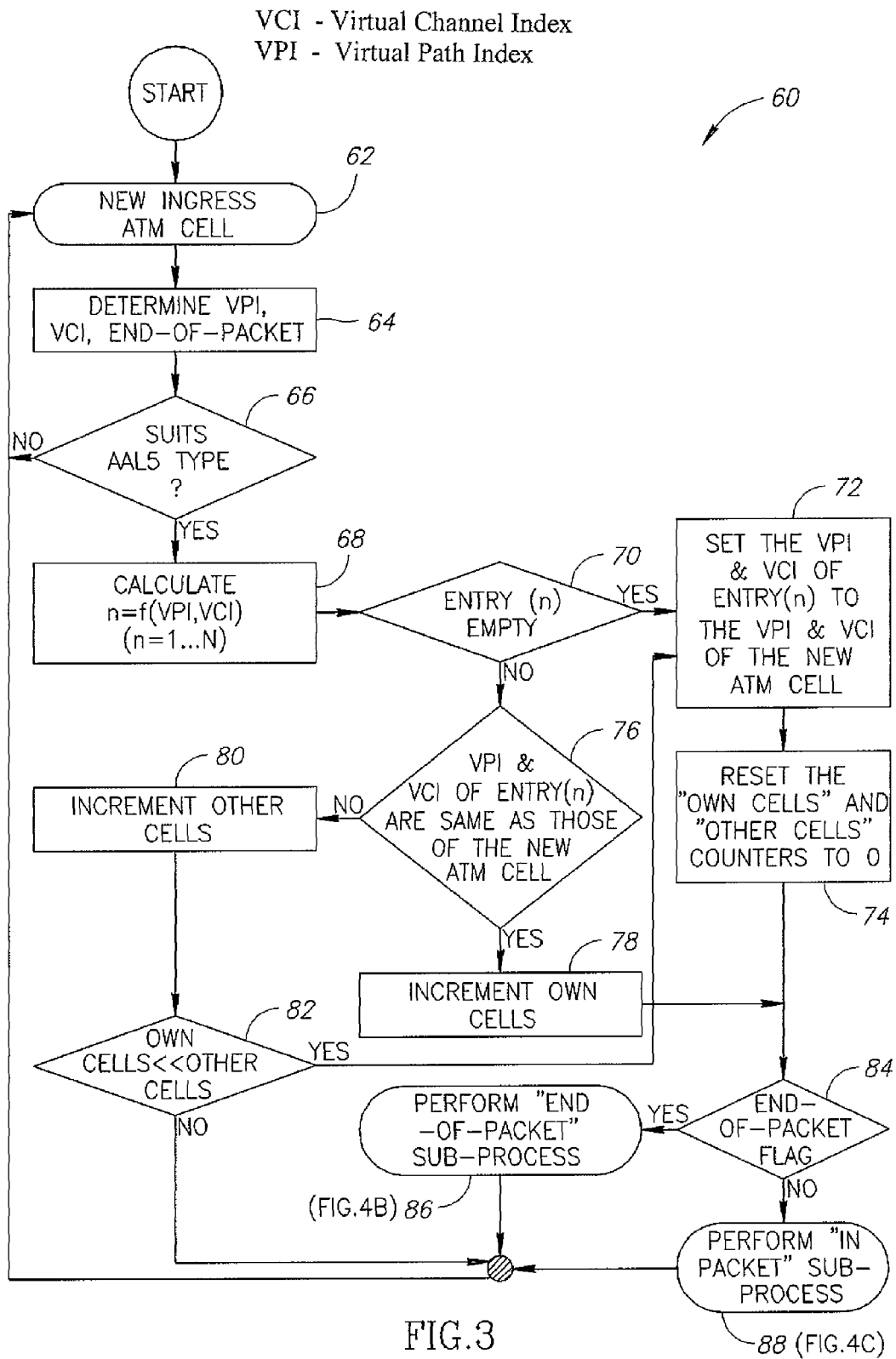

FIG. 3 schematically shows one possible mechanism 60 for managing the statistic database, which is in the core of this invention. The specific process described by the figure starts upon arrival of an ATM cell (block 62), on a specific ATM interface. The network node is expected to determine the VP Index (VPI) and VC Index (VCI) of that ATM cell, as well as detecting the special mark within the ATM cell header for an AAL5 packet's last cell (block 64). Would a common database be assigned for multiple ATM Interfaces, it would have been necessary to determine also the ATM Interface Index (IFIndex) associated with each ATM incoming cell. It is possible that the received ATM cell belongs to a VPC that is not subject to the proposed mechanism (e.g., if the VPC carries AAL2 traffic), in such a case the process terminates, but if the cell suits the condition (block 66), then the network node calculates the entry (line) number (block 68) within the statistic database that is potentially where the statistics for the respective VCC are to be located. The calculation of such an entry number can be performed using any preferred formula; one examples is given in the

SUMMARY OF THE INVENTION

It is possible that the obtained entry "n" in the statistic database was never used for collecting statistic information (entry is "empty", block 70). In such a case the VPI and VCI values of the received ATM cell (and optionally the IfIndex of the related ATM Interface) will be recorded into the respective entry (block 72) and all other fields/columns will be cleared (block 74).

It is further possible that, due to previous ATM cells received by the network node, the entry "n" in the statistic database is already assigned for collecting statistic information regarding to the same VCC as the one to which the "new" ATM cell belongs (block 76). In such a case only the Own Cells counter that counts such events is to be incremented (78).

It is further possible that, an ATM cell from any VCC will be mapped by the said calculation to the entry "n" in the statistic database that is already assigned for collecting statistic information regarding to another VCC. In such a case only the Other Cells counter that counts such events is to be incremented (block 80).

However, if the network node experiences, for any specific entry in the statistic database, that too many events (i.e., the exact criteria is not part of the invention) of incrementing the OtherCells counter (compared to the number of times the network node incremented the OwnCells counter, block 82) it may decide to replace the database entry assignment by assigning this entry to the VCC represented by the currently handled ATM cell. In such a case the VPI and VCI values of the received ATM cell (and optionally the IfIndex of the related ATM Interface) will be recorded into the respective entry and all other fields/columns will be cleared (back to blocks 72, 74).

If a received ATM cell belongs to a VCC that is currently assigned to an entry in the statistic database, the drawing also shows that the process may further refer to the special mark within the ATM cell header for an AAL5 packet's last cell (block 84). This information is required for the discard method according to the invention, when applied.

Figure 4A:
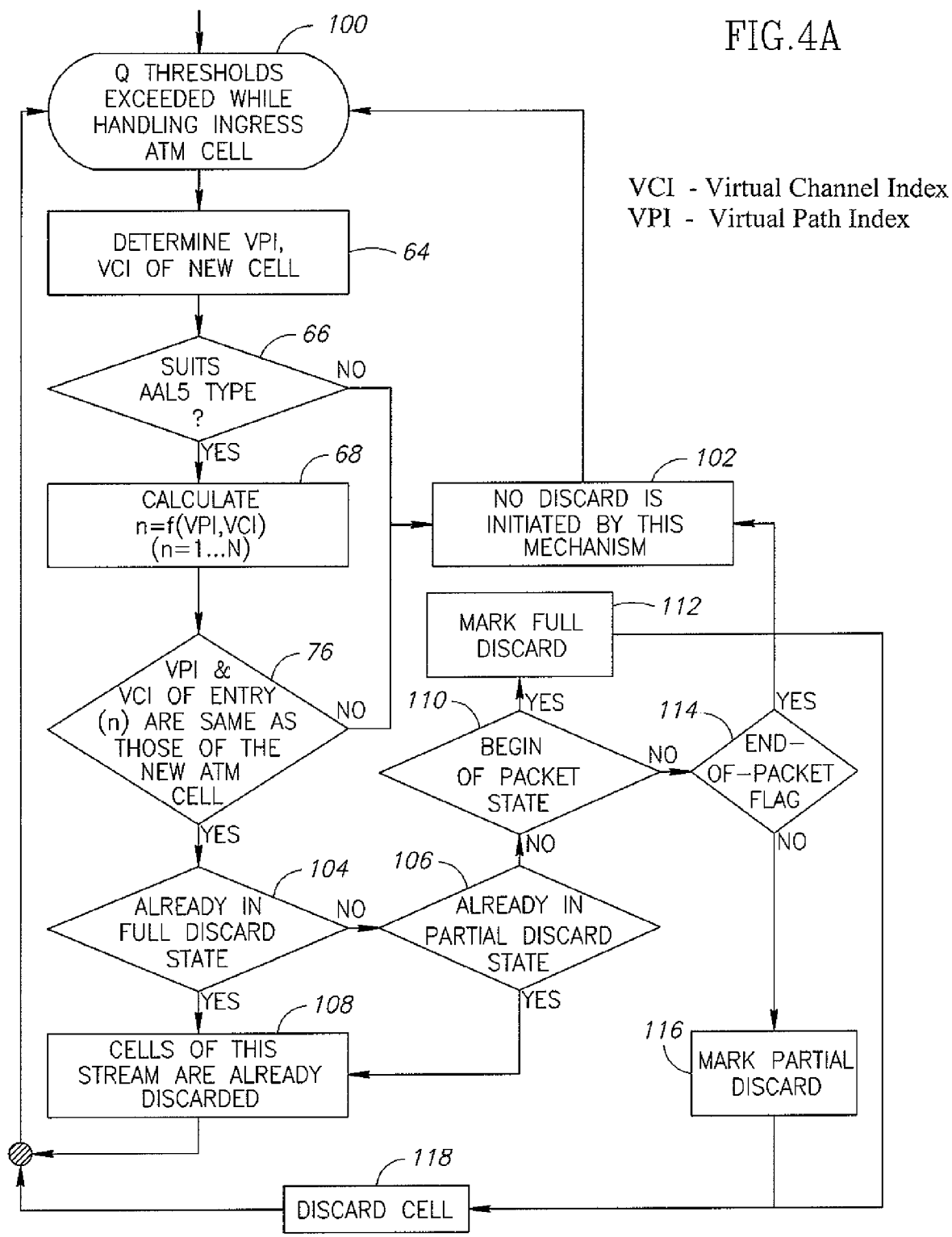
FIG. 4b schematically illustrates one algorithmic version of a sub process which can be executed when a flag "end of packet" is detected.
FIG. 4c schematically illustrates one algorithmic version of a sub process which can be executed when the VCC status is "in packet".
Figure 4B:
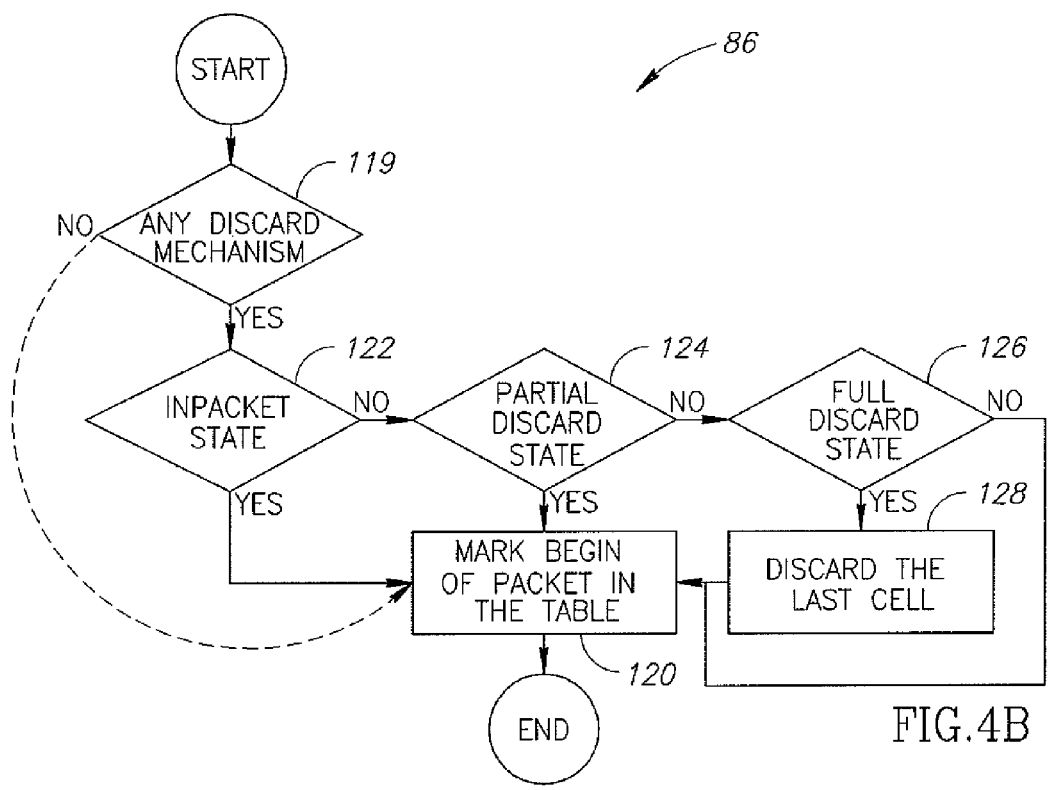

In case the ATM cell has the "last cell" mark or flag, the process may perform some specific operations symbolically indicated as a sub-routine 86 and illustrated by FIG. 4b).

Figure 4C:
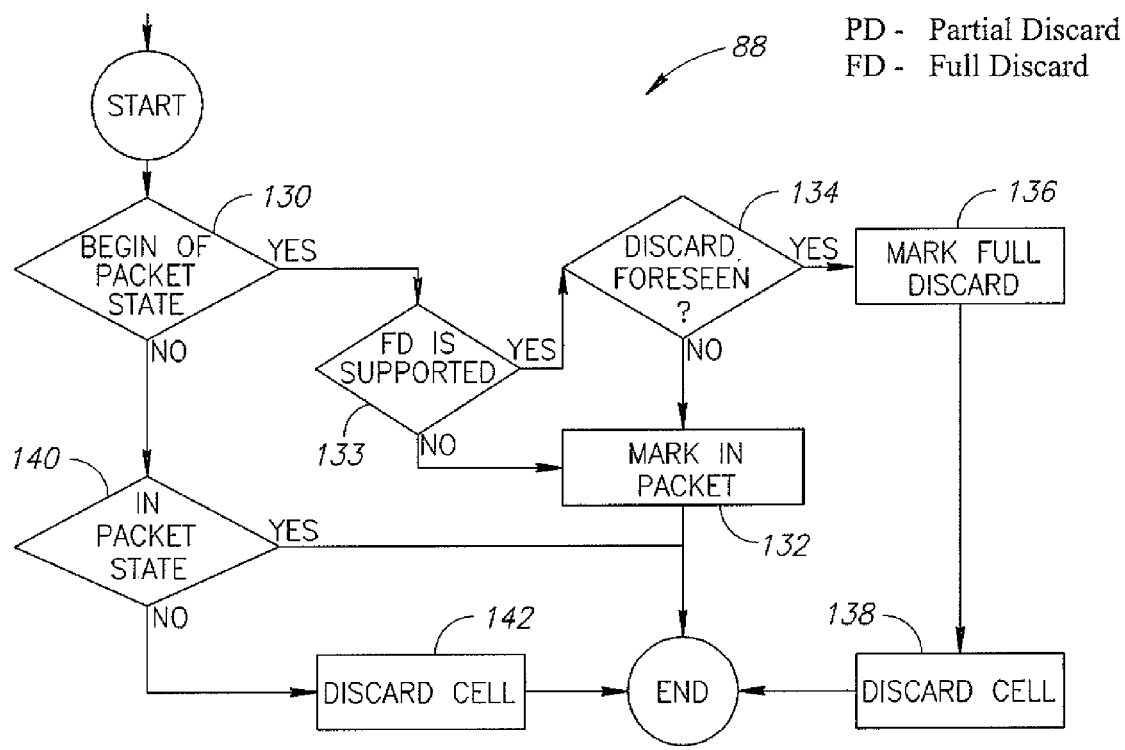

In case the ATM cell does not have the said "last cell" mark, the process performs some other specific operations of a sub-routine 88 and illustrated by FIG. 4c.

FIG. 4a schematically shows a possible mechanism for responding to actual congestion events if such occur in the network for a specific ATM Interface, and illustrates the method of packet discard according to this invention. The specific process described by the figure starts upon detecting a congestion event (for example, event indicated in box 100) while handling any incoming ATM cell which is related to the specific ATM Interface. The network node is expected (as part of managing the statistics database, see FIG. 3) to determine the VPI and VCI values of the ATM cell, as well as detecting whether or not it is an AAL5 packet's last cell (block 64). It is possible that the received ATM cell belongs to a VPC that is not subject to the proposed mechanism (e.g., if the VPC carries AAL2 traffic; block 66), in such a case the process terminates (block 102). If the cell is suitable, the network node calculates the entry (line) number "n" within the statistic database that is related to the VCC to which this ATM cell belongs (block 68).

It is possible that the related entry in the statistic database is already assigned for collecting statistic information regarding to another VCC (i.e., multiple VCCs may be mapped to the same entry; block 76). In such a case the process terminates.

If the entry "n" in the statistic database is assigned for collecting statistic information regarding to the same VCC to which the ATM cell belongs, the process analyzes the status field of the entry.

In case the ATM cell is part of an AAL5 packet that is executing a full discard process (state field has the FullDiscard value) or a partial discard process (state field has the PartialDiscard value) (blocks 104, 106), the ATM cell is supposed to be already under discard (block 108) per the sub routines described by FIGS. 4b and 4c.

In case the ATM cell is the beginning of a new AAL5 packet (state field has the BeginOfPacket value, block 110) the cell is discarded and the state field is changed to have the FullDiscard value (blocks 112, 118).

In case the ATM cell is part of an AAL5 packet that its prefix (i.e., all preceding ATM cells) already successfully forwarded (state field has the InPacket value) then only in case the said ATM cell is not the AAL5 packet's last cell (block 114), it is discarded and the state field is changed to have the PartialDiscard value (block 116, 118).

FIG. 4b schematically describes a possible mechanism 86 executed in case the ATM cell handled by the statistic database management process (FIG. 3) is marked as the "last cell" of an AAL5 packet.

In case the ATM cells discard aspect of this invention is for any reason unused there is no special action to be performed. This is indicated by the dotted link between the "start" of sub-routine 86, via block 119, and "Mark BeginPacket" operation (block 120).

When there is any sort of ATM cells discard mechanism being used, according to a preferred version of this invention, the figure describes that the "last cell" of an AAL5 packet will be discarded (block 128) only in case all previous ATM cells of the same packet were discarded too (blocks 122, 124, 126).

Before terminating this sub process it is required to update the status field of at the respective entry in the statistic database to tell that the next ATM cell received for the same VCC is expected to be the first ATM cell of a new AAL5 packet (block 120).

FIG. 4c schematically describes a possible mechanism executed in case the ATM cell handled by the statistic database management process (FIG. 3) is not marked as the "last cell" of an AAL5 packet (sub-routine 88).

When the ATM cell is the first cell of an AAL5 packet (status of the related entry in the statistic database has the BeginOfPacket value, block 130) the figure indicates a possible interpretation of a Full Discard (FD) mechanism.

In case FD is supported by the system (Block 133, "Yes") and it is expected that the network node will successfully forward the whole AAL5 packet (block 134 of congestion forecast, "No"), the status of the related entry in the statistic database is changed to the InPacket value (block 132).

In case FD is supported and it is expected that the AAL5 packet cannot be fully forwarded by the network node (block 134, "Yes"), the status of the related entry in the statistic database is changed to the FullDiscard value (block 136) and the said first ATM cell of the AAL5 packet is discarded (block 138).

In case the FD aspect of this invention is not supported or not being used for any reason, there is no action to be performed for the said first ATM cell of the AAL5 packet as long as there is no actual congestion (per FIG. 4*a*).

When the status of the related entry in the statistic database has a value other than BeginOfPacket (block 130, 140), it should be verified that it is not due to a decision to discard cells from said AAL5 packet (per FIG. 4*a* or 4*b*).

The status of the related entry in the statistic database has the InPacket value in case there was no actual congestion so far during forwarding previous ATM cells from the said AAL5 packet.

The status of the related entry in the statistic database has a value other than InPacket value (i.e., while the said ATM cell is not the first ATM cell of an AAL5 packet) only if the respective AAL5 packet is at least partially being discarded. The said ATM cell will be discarded too (block 142).

While the invention has been described with reference to the attached drawings, it should be appreciated that other versions and modifications of the method, software product and network node could be proposed and is should be considered part of the invention which is defined by the claims which follow.

The invention claimed is:

1. A method of handling ATM traffic comprising one or more Virtual Path Connections (VPCs) being streams of packets of AAL5 type composed of ATM cells, the method comprising handling said traffic at a network node at VP-layer being the layer of VPCs, wherein said node is initially unaware about type of VC services inside a Virtual Path Connection VPC, the method including:
  providing a database,
  monitoring each of said cells incoming the node and determining at least VC-layer and VP-layer parameters of a cell being monitored,
  processing information on said determined parameters,
  registering the processed information concerning each of said cells in the database,
  by using the registered information, forming statistical data with respect to at least combinations of the VC-layer and VP-layer parameters of the packets being handled at the node, so that most frequent of said combinations are registered in the data base, thereby making the network node, handling the ATM traffic at VP-layer, aware about nature and behavior of various AAL5 streams in a particular VP connection, and
  analyzing the statistical data,
  performing an AAL5 packet discard policy at the VP layer by making decisions on discard of the cells being monitored, said decisions depending on results of analysis of the statistical data, taking into account frequency of appearance, in the database, of a combination of VC-layer and VP-layer parameters of a particular cell being monitored,
  wherein each of said packets belongs to a particular VCC (Virtual Channel Connection) and a particular VPC (Virtual Path Connection), and wherein each said packet comprises a number of ATM cells, and for each said packet, each of the cells have a same value of VC-index (VCI) and a same value of VP-index (VPI), the method further comprising:
  determining said VC-layer and VP-layer parameters by determining VPI and VCI values of the cell; and
  registering the processed information per each of the monitored cells in the database, to allow judging about VCCs in a particular VP connection and thereby enabling awareness of the network node about VCCs at the VP layer and frequency of their appearance in the ATM traffic being handled,
  wherein the step of forming the statistical data is performed by building a table arranged for N entries assigned to N different VCCs, wherein each entry registers a number of fields assigned for at least the following purposes: indicating a VPI value, indicating a VCI value, a counter of "own cells", a counter of "other cells", AAL5 packet status,
  wherein the fields "own cells" and "different cells" serve for distinguishing different VCCs which can be mapped to the same entry,
  said method further comprising replacing a particular entry by reassigning it to another VCC if in said entry a reading of the "own cells" counter is significantly smaller than a reading of the "other cells" counter.

2. The method of handling ATM traffic at a network node, according to claim 1, wherein the node has multiple ATM Interfaces, the method comprises providing one or more said databases for respectively serving a number of the multiple ATM Interfaces.

3. The method according to claim 2, comprising an additional step of indicating a particular ATM Interface, for each ATM cell received there-through, by an additional parameter being a unique ATM Interface index (Ifindex), the method also comprising monitoring each of incoming cells from the point of that additional parameter, processing the additional parameter together with said parameters and registering result of the processing in a common database for serving at least a number of the multiple ATM Interfaces.

4. The method according to claim 1, further comprising monitoring each of the incoming ATM cells in respect of "end of packet" indication and, based on the presence or absence of said indication, complementing the database with a status of the VCC under monitoring to which the cell being registered belongs.

5. The method according to claim 4, further comprising indicating the status in the statistical database as follows:
  Begin Of Packet—where the monitored VCC starts transferring a new packet, in case the previous ATM cell belonging to the VCC under monitoring carried an "End Of Packet" indication;
  In Packet—where the monitored VCC is in the middle of the AAL5 packet transmission.

6. The method according to claim 5, further comprising indicating additional status options for informing whether the current VCC is already under a packet discard process; said status options being either PD (partial discard) or FD (full discard).

7. The method according to claim 1, wherein the step of processing the VC-layer and VP-layer parameters is performed by applying an arbitrary function f(VPI, VCI)=n (n=1 ... N) to values of VPI and VCI of each of the incoming ATM cells, wherein the value n is a natural number between 1 and N and represents the entry number in the database to which the incoming ATM cell is registered.

8. The method according to claim 1, comprising registering, per each entry, an additional field for indicating an index of the ATM Interface (IfIndex), wherein the step of processing the IfIndex, VCI and VPI parameters is performed by applying an arbitrary function f(IfIndex, VPI, VCI)=n (n=1 ... N) to values of IfIndex, VPI and VCI of each of the incoming ATM cells, wherein the value n is a natural number between 1 and N and represents the entry number in the statistical database to which the incoming ATM cell is mapped.

9. A method of AAL5 packets discard at a VP-layer, with respect to said packets handled at a network node according to the method according to claim 1, wherein the step of making said decisions comprises the following operations:
 detecting a new congestion event in the network while monitoring a cell belonging to a particular Virtual Channel Connection (VCC),
 based on the results of analysis of the statistical data, deciding whether said particular VCC is suitable for discarding,
 if yes, discarding cells of the VCC according to a selected discard policy,
 if not, repeating said operations with respect to a new incoming cell.

10. The method according to claim 9, wherein the step of analyzing the statistical data in the database comprises checking whether the particular VCC is registered as one of entries of the database:
 if the VCC is not registered in the database, making a decision not to discard the cell, and
 if the VCC is registered in the database, making a decision to discard the cell.

11. The method according to claim 9, further comprising indicating, in the database, status of the VCC being monitored so as to distinguish a "begin packet" status and an "in packet" status,
 the method also comprises checking the status and depending on the status "in packet" or "begin of packet", applying the following discard decisions:
 when the status is "begin of packet", performing a Full Discard policy;
 when the status is "in packet", performing a Partial Discard policy.

12. The method according to claim 9, wherein the step of making decisions further includes a check whether cells of the particular VCC are already under discard, and if yes, repeating the method with respect to the VCC of the next incoming cell in case the congestion event persists.

13. The method according to claim 9, further comprising a step of forecasting an expected congestion event, and if said expected event is forecast, a discard decision is made for the incoming VCC which is considered, and performed on the basis of status "begin of packet" and by applying a Full Discard policy.

14. A software product comprising computer implementable instructions and/or data for carrying out the methods according to claim 1, stored on an appropriate non-transitory computer readable medium.

15. A network node adapted to and capable of performing the method according to claim 1.

16. The network node according to claim 15, being a Digital Subscriber Line Access Multiplexer (DSLAM).

* * * * *